United States Patent
Pieber et al.

(10) Patent No.: US 9,401,739 B2
(45) Date of Patent: Jul. 26, 2016

(54) RF DEVICE AND METHOD WITH IMPROVED ACTIVE LOAD MODULATION CAPABILITY

(71) Applicant: NXP B.V., Eindhoven (NL)

(72) Inventors: Michael Pieber, Kumberg (AT); Erich Merlin, Gratkorn (AT); Stefan Mendel, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/321,433

(22) Filed: Jul. 1, 2014

(65) Prior Publication Data

US 2015/0031315 A1    Jan. 29, 2015

(30) Foreign Application Priority Data

Jul. 23, 2013    (EP) .................................... 13177543

(51) Int. Cl.
*H04B 1/44* (2006.01)
*H04B 5/00* (2006.01)
*H04B 5/02* (2006.01)

(52) U.S. Cl.
CPC ............... *H04B 1/44* (2013.01); *H04B 5/0075* (2013.01); *H04B 5/02* (2013.01)

(58) Field of Classification Search
CPC .................................. H04B 1/44; H04B 5/0075
See application file for complete search history.

(56) References Cited

U.S. PATENT DOCUMENTS

| | | | |
|---|---|---|---|
| 2002/0160713 A1* | 10/2002 | Flaxl | 455/41 |
| 2008/0012712 A1* | 1/2008 | Shimizu | 340/572.5 |
| 2009/0206999 A1 | 8/2009 | Stewart | |
| 2010/0112941 A1* | 5/2010 | Bangs et al. | 455/41.1 |
| 2011/0053503 A1* | 3/2011 | Witschnig et al. | 455/41.1 |
| 2011/0068178 A1 | 3/2011 | Gebhart | |
| 2011/0205026 A1* | 8/2011 | Bateman | 340/10.1 |
| 2013/0321230 A1 | 12/2013 | Merlin et al. | |

FOREIGN PATENT DOCUMENTS

| | | |
|---|---|---|
| EP | 1 884 881 A1 | 2/2008 |
| WO | 2008/117029 A2 | 10/2008 |
| WO | 2011/041849 A1 | 4/2011 |
| WO | 2011/058455 A1 | 5/2011 |

OTHER PUBLICATIONS

Extended European Search Report for EP Patent Appln. No. 13177543.9 (Dec. 6, 2013).

* cited by examiner

*Primary Examiner* — David Bilodeau

(57) ABSTRACT

There is described an RF bidirectional communication device utilizing active load modulation, the device comprising (a) a resonance circuit including an antenna (326), and (b) a control unit (322) for controlling communication of the device, including switching between a transmission mode and a receiving mode, wherein the control unit is adapted to (c) modify a configuration of the resonance circuit such that the resonance circuit has a first resonance frequency ($f_0$) when the device is in the transmission mode and a second resonance frequency ($f_0 + \Delta f$) when the device is in the receiving mode, and (d) modify the configuration of the resonance circuit such that a Q-factor of the resonance circuit is periodically decreased while the device is in the transmission mode. There is also described a corresponding method and a system comprising a RF device and a reader/writer device. Furthermore, there is described a computer program and a computer program product.

20 Claims, 3 Drawing Sheets

RF DEVICE AND METHOD WITH IMPROVED ACTIVE LOAD MODULATION CAPABILITY

CROSS-REFERENCE TO RELATED APPLICATIONS

This application claims the priority under 35 U.S.C. §119 of European patent application no. 13177543.9, filed on Jul. 23, 2013, the contents of which are incorporated by reference herein.

FIELD OF THE INVENTION

The present invention relates to the field of RF devices, in particular to RF devices for short range or contactless communication using active load modulation.

ART BACKGROUND

Recent RF devices, such as contactless transponder cards (e.g. Smartcards, e-Passports, Tickets, etc.) and NFC (Near Field Communication) devices, are capable of performing half-duplex bi-directional communication with a reader device. Thus, these RF devices are capable of operating in a receiving mode as well as in a transmitting mode. In the transmitting mode, RF devices may utilize active load modulation to transmit the information or data. In order to optimize the transmission, the antenna circuit of the RF device is tuned to the carrier frequency of the reader device, e.g. to 13.56 MHz in systems complying with ISO/IEC 14443 and NFC standards. However, such an antenna configuration is usually not ideal for use in the receiving mode, as the shape of the reader modulation may experience a negative impact. Similarly, an antenna configuration optimized for the receiving mode is usually not ideal for use in the transmitting mode.

There may thus be a need for a way of improving the conditions for bi-direction communication between RF devices.

SUMMARY OF THE INVENTION

This need may be met by the subject matter according to the independent claims. Advantageous embodiments of the present invention are set forth in the dependent claims.

According to a first aspect, there is provided an RF bidirectional communication device utilizing active load modulation, the device comprising (a) a resonance circuit including an antenna, and (b) a control unit for controlling communication of the device, including switching between a transmission mode and a receiving mode, wherein the control unit is adapted to (c) modify a configuration of the resonance circuit such that the resonance circuit has a first resonance frequency when the device is in the receiving mode and a second resonance frequency when the device is in the transmission mode, and (d) modify the configuration of the resonance circuit such that a Q-factor of the resonance circuit is periodically modified while the device is in the transmission mode.

This aspect is based on the idea that the resonance frequency and the Q-factor of the resonance circuit are optimized to either of the transmission mode and the receiving mode. By choosing the second resonance frequency to be equal to the carrier frequency of a corresponding reader/writer device, a relatively high Q-factor can be obtained such that transmission can take place efficiently. More specifically, the high Q-factor allows greater output power for the sideband levels and thereby a high LMA (load modulation amplitude). Similarly, by choosing a different resonance frequency in the receiving mode, i.e. the first resonance frequency, reception can be optimized as a lower Q-factor provides a greater bandwidth which is beneficial for reception as the received signal is less influenced. Furthermore, this aspect is based on the idea that by periodically modifying the Q-factor of the resonance circuit while the device is in the transmission mode, the long time for settling of the voltages at the antenna network caused by the high Q-factor can be countered. More specifically, by periodically modifying the Q-factor within the modulation pauses during transmission, the antenna circuit is forced back to its idle condition within a short period.

In the present context, the term "Q-factor" denotes the "quality factor", also known in the art simply as "Q", which characterizes the bandwidth of the resonance circuit relative to its resonance frequency.

In the present context, the term "modifying the Q-factor" may particularly denote increasing and/or decreasing the Q-factor.

In the present context, the term "configuration of the resonance circuit" may particularly denote the physical configuration of the electrical components that form the resonance circuit.

The RF bidirectional communication device may in particular be a contactless transponder card or an NFC device.

The control unit may comprise a processor and program memory loaded with control programs. Alternatively or additionally, the control unit may comprise dedicated hardwired logic. In any case, the control unit is capable of controlling various communication functions of the device. In particular, the control unit may modify the configuration of the resonance circuit by controlling respective switches such that various electronic components are connected or disconnected from the resonance circuit, thereby changing the resonance frequency and/or Q-factor of the resonance circuit. The switches may be comprised by the control unit or they may be separate from the control unit. In the latter case, the switches are connected to the control unit such that the control unit may control the state of the switches by transmitting corresponding control signals to a control terminal of each switch.

According to an embodiment, the resonance circuit comprises a switchable capacitive circuit, and the control unit is adapted to modify the configuration of the resonance circuit by selectively connecting and disconnecting the switchable capacitive circuit.

In particular, the switchable capacitor circuit may comprise one or more capacitors which may be individually connected and disconnected from the resonance circuit by the control unit. Thereby, by changing the configuration of capacitors in the resonance circuit, the resonance frequency can be changed accordingly.

According to a further embodiment, the control unit is adapted to connect the switchable capacitive circuit when switching from the receiving mode to the transmission mode and to disconnect the switchable capacitive circuit when switching from the transmission mode to the receiving mode.

In other words, in this embodiment, the switchable capacitive circuit is part of the resonance circuit when the device is operating in the transmission mode, whereas the switchable capacitive circuit is not part of, i.e. disconnected from the resonance circuit when the device is operating in the receiving mode.

It should be noted that the above refers to a case where the first resonance frequency is higher than the second resonance frequency. In the opposite case, i.e. a case where the first resonance frequency is lower than the second resonance frequency, the switchable capacitive circuit would be part of the resonance circuit when the device is operating in the receiving mode and disconnected when the device is operating in the transmission mode.

According to a further embodiment, the first resonance frequency is larger or smaller than the second resonance frequency.

This may in particular be achieved by designing the switchable capacitive circuit such that it constitutes a capacitor arranged in parallel with the antenna when the switchable capacitive is connected to the resonance circuit. In this case, the resonance frequency of the resonance circuit will increase when the switchable capacitive circuit is disconnected, i.e. when the total capacitance arranged in parallel with the antenna is reduced.

According to a further embodiment, the resonance circuit comprises an adjustable resistive circuit, wherein the control unit is adapted to adjust the resistance of the resistive circuit in an alternating manner when the device is in the transmission mode.

The adjustable resistive circuit may be constituted by at least one resistor and is arranged in such a way that it influences the total resistance of the antenna circuit.

Thereby, by adjusting the resistance of the adjustable resistive circuit in an alternating manner, the Q-factor of the resonance circuit will alternate between a higher value and a lower value. More specifically, when the resistance of the adjustable resistive circuit is increased, the Q-factor is reduced, and when the resistance of the adjustable resistive circuit is reduced, the Q-factor is increased.

Accordingly, the above mentioned advantageous effect that the long time for settling of the voltages at the antenna network caused by the high Q-factor can be countered may be obtained in a simple and cost efficient way. In particular, by reducing the Q-factor within the modulation pauses during transmission, the antenna circuit is forced back to its idle condition within a short period.

According to a further embodiment, the first resonance frequency is 14.4075 MHz and/or the second resonance frequency is 13.56 MHz.

These exemplary values of the first and second resonance frequencies will allow the device to operate in accordance with devices complying with e.g. the NFC standard. It is noted that other frequency values may be selected depending on the circumstances.

According to a second aspect, there is provided a method of performing bidirectional communication between an RF device and a reader/writer device, the method comprising (a) setting the RF device to operate in a receiving mode by configuring a resonance circuit of the RF device to have a first resonance frequency, the resonance circuit including an antenna, (b) receiving, at the RF device, a request for transmission from the reader/writer device, (c) setting the RF device to operate in a transmission mode by configuring the resonance circuit of the RF device to have a second resonance frequency, and (d) during operation in the transmission mode, modifying the configuration of the resonance circuit such that a Q-factor of the resonance circuit of the RF device is periodically modified.

This aspect of the invention is based on the same idea as the first aspect which is discussed in detail above and provides at least the same advantages.

According to an embodiment, the method further comprises, after finalizing operation in the transmission mode, re-setting the RF device to operate in the receiving mode by configuring the resonance circuit of the RF device to have the first resonance frequency.

Thereby, it can be assured that the RF device is ready to react to a new request for transmission from the same or another reader/writer device.

The method may preferably be implemented in a device according to the first aspect and any of the embodiments thereof as described above.

According to a third aspect, there is provided a computer program comprising computer executable instructions which when executed by a computer causes the computer to perform the steps of the method according to the third aspect.

According to a fourth aspect, there is provided a computer program product comprising a computer readable data carrier loaded with a computer program according to the fourth aspect.

The third and fourth aspects of the invention are based on the same idea as the first aspect described in detail above. Furthermore, the third and fourth aspects make it possible to implement the invention in an existing RF device design with only minimum hardware modifications being necessary, i.e. the modification of the resonance circuit.

According to a fifth aspect, there is provided a system for performing bi-directional RF communication, the system comprising (a) a reader/writer device, and (b) a device according to the first aspect or any of the above embodiments.

Also the fifth aspect is based on the same idea as the first aspect described above. Furthermore, it provides the additional advantage of a matching pair of RF device and reader/writer device.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is part of the disclosure of this document.

The aspects defined above and further aspects of the present invention are apparent from the examples of embodiment to be described hereinafter and are explained with reference to the examples of embodiment. The invention will be described in more detail hereinafter with reference to examples of embodiment to which the invention is, however, not limited.

DETAILED DESCRIPTION

Figure 1:
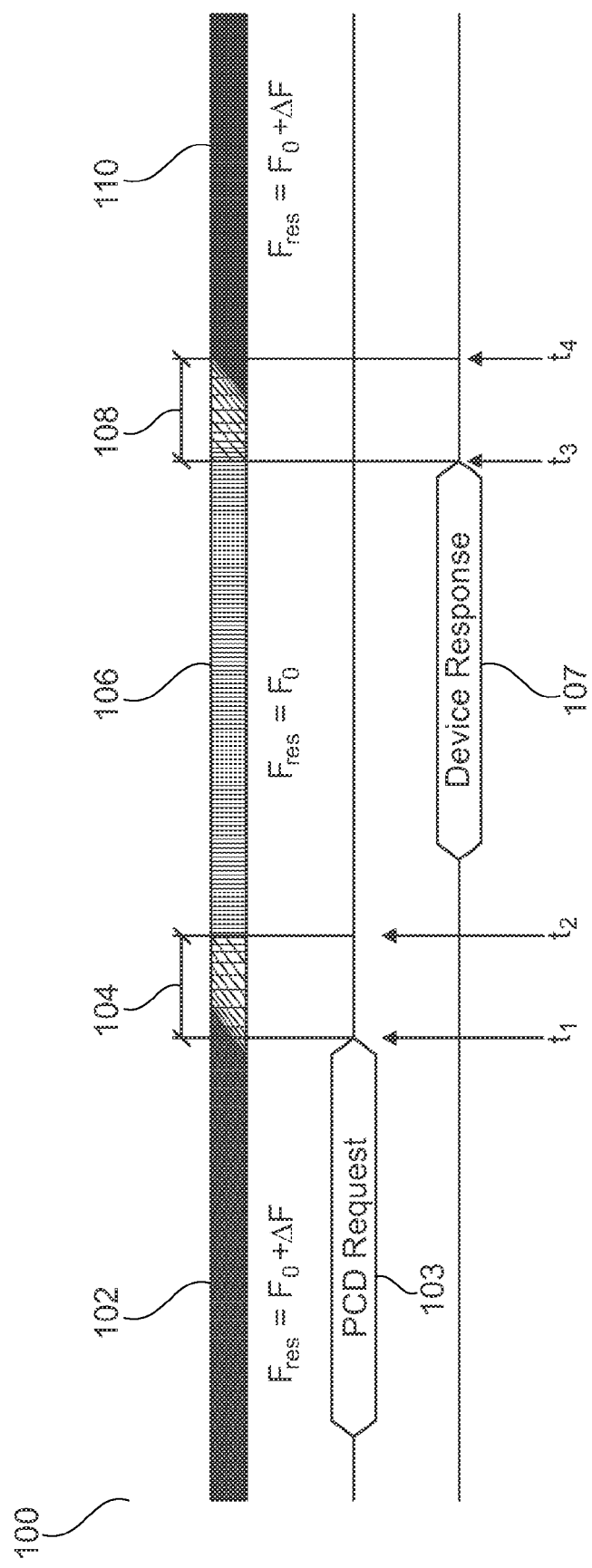
FIG. 1 shows a schematic overview of bi-directional communication in accordance with an embodiment.

The illustration in the drawing is schematic. It is noted that in different figures, similar or identical elements are provided with the same reference signs or with reference signs, which differ only within the first digit.

FIG. 1 shows a schematic overview 100 of bi-directional communication between an RF device and a reader/writer device in accordance with an embodiment. At this stage, the general principle of communication will be discussed. A specific example of a hardware configuration of an RF device is given below in conjunction with FIG. 3.

More specifically, the left-most part of FIG. 1 shows that an RF device is operating in a receiving mode during period 102. More specifically, the resonance frequency $f_{res}$ of the RF device's resonance circuit is set to $f_0+\Delta f$, i.e. $f_{res}=f_0+\Delta f$. Here, $f_0$ is the carrier frequency of a reader/writer device (not shown). During period 102, the RF device receives a request for transmission 103 from the reader/writer device. At time $t_1$, an "end of reception notification" is issued and a switching of the RF device to the transmission mode is initiated and completed during period 104. Then, during period 106, i.e. from time $t_2$ to time $t_3$, the RF device is operating in the transmission mode where the resonance frequency is equal to the carrier frequency of the reader/writer device, i.e. $f_{res}=f_0$. During this period 106, the RF device transmits a response 107 to the request 103. At time $t_3$, an "end of transmission notification" is issued and a switching back to the receiving mode takes place during period 108. From time $t_4$, the device is again operating in the receiving mode, i.e. $f_{res}=f_0+\Delta f$. This period is labeled 110.

Figure 2:
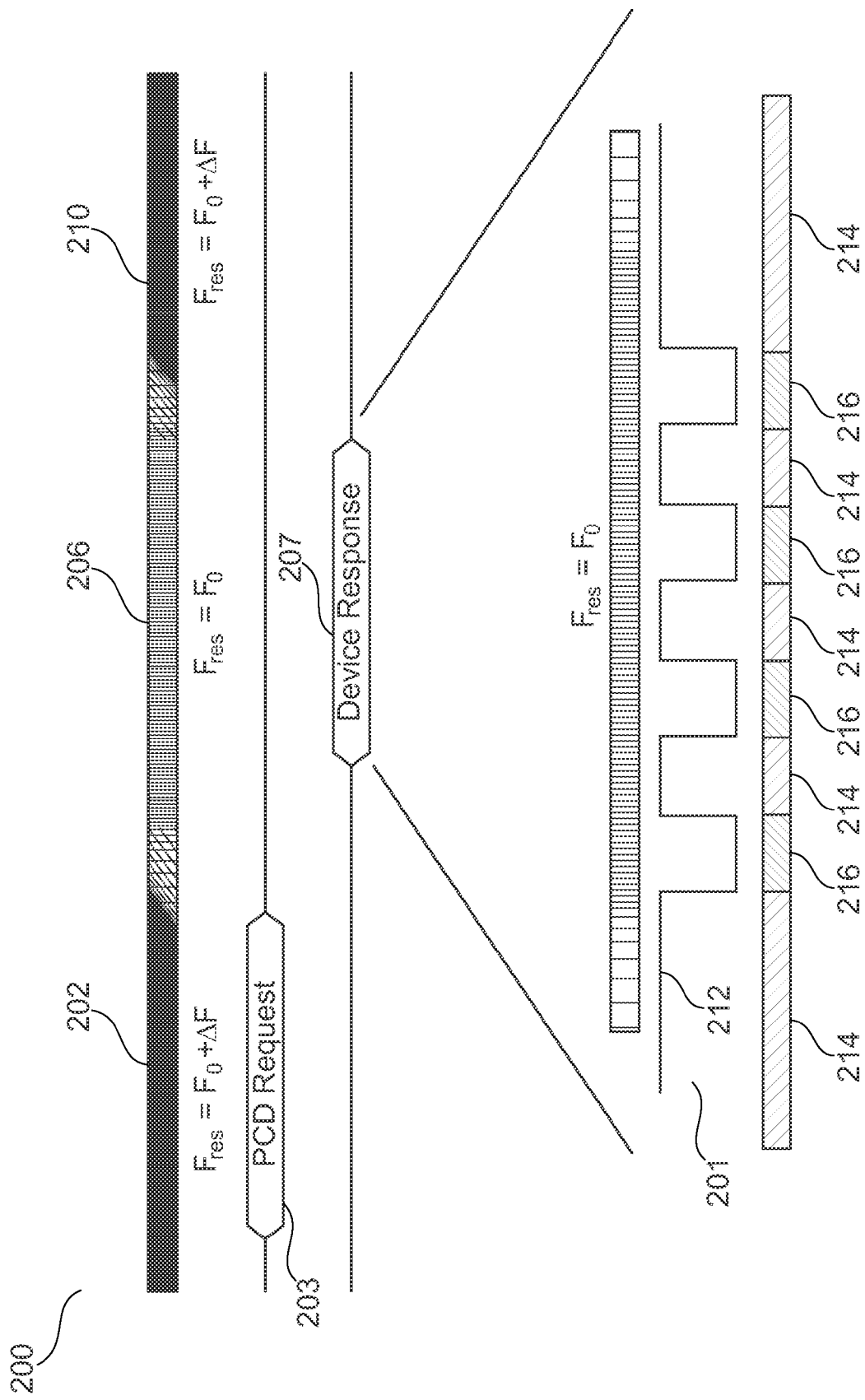
FIG. 2 shows a more detailed overview of a transmission phase during bi-directional communication as illustrated in FIG. 1.

Turning now to FIG. 2, which in its lower part shows a more detailed overview 201 of the transmission phase 106/206 discussed above in conjunction with FIG. 1. It is noted that the upper part 200 of FIG. 2 corresponds to the illustration of FIG. 1. More specifically, the detailed overview 201 shows a control signal 212 for controlling an adjustable resistive circuit. The shown control signal 212 has the shape of a square wave, but other embodiments may use other waveforms. When the control signal is high, the resistance of the adjustable resistive circuit is increased such that the resistance of the antenna circuit is increased. This results in periods 214 where the Q-factor of the resonance circuit is somewhat reduced in comparison to periods 216 where the resistance of the adjustable resistive circuit is reduced. As can be seen, the control signal 212 is low during the periods 216.

Figure 3:
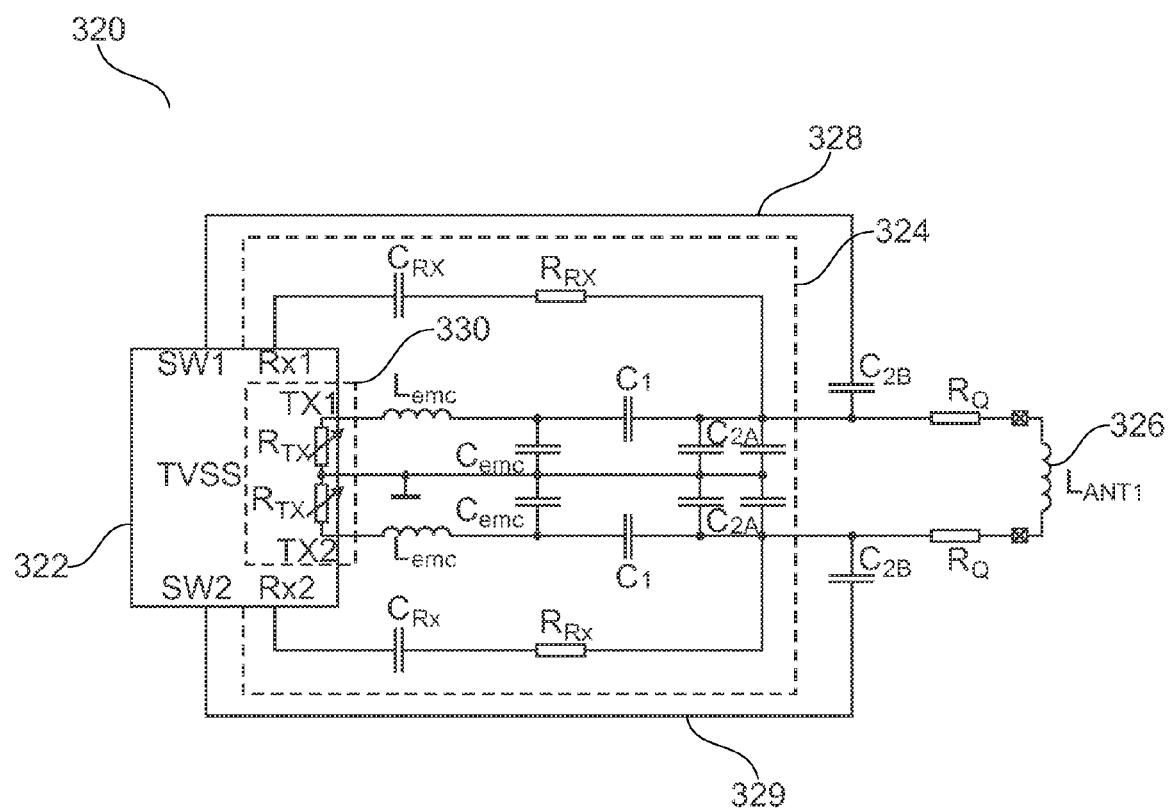
FIG. 3 shows a circuit diagram of an RF device in accordance with an embodiment.

FIG. 3 shows a circuit diagram of an RF device 320 in accordance with an embodiment. More specifically, the RF device 320 comprises a control unit 322 and a main resonance circuit 324 connected to antenna 326. Furthermore, the RF device 320 comprises switchable capacitors $C_{2B}$, which are connected to switches (not shown) within the control unit 322 via connecting wires 328 and 329. Yet further, the RF device 320 comprises an adjustable resistive circuit 330 comprising resistors $R_{TX}$. The resistance of resistors $R_{TX}$ can be adjusted such that the Q-factor of the complete resonance circuit is adjusted accordingly.

The control unit 322 control switching between the receiving mode and transmission mode in line with the principles discussed above in conjunction with FIGS. 1 and 2. More specifically, to enter the receiving mode, the control unit 322 disconnects the wires 328 and 329 such that capacitors $C_{2B}$ are both disconnected from the main resonance circuit 324. Thereby, the resonance frequency of the complete resonance circuit is not influenced by the capacitors $C_{2B}$. In this mode, the resonance frequency is $f_{res}=f_0+\Delta f$ as discussed above in conjunction with FIGS. 1 and 2. Thereby, the Q-factor is relatively small and the bandwidth for receiving signals from a reader/writer device correspondingly large.

Now, to enter the transmission mode, the control unit 322 connects the wires 328 and 329 to GND (ground) such that the capacitors $C_{2B}$ are now connected in parallel with capacitors $C_{2A}$ of the main resonance circuit 324. Thereby, the resonance frequency of the complete resonance circuit is influenced by the capacitors $C_{2B}$. More specifically, the total capacitance in parallel with antenna 326 is increased and the resonance frequency of the complete resonance circuit is reduced to $f_{res}=f_0$ (see also the above discussion in conjunction with FIGS. 1 and 2). Accordingly, the Q-factor is also relatively large in comparison to the receiving mode. During transmission, the control unit 322 further operates to periodically adjust the resistors $R_{TX}$ such that the Q-factor of the resonance circuit alternates between the aforementioned relatively large value and a somewhat lower value due to the alternating resistance of the circuit.

Although the above embodiment relies on switching the resonance frequency between $f_{res}=f_0$ and $f_{res}=f_0+\Delta f$, it is noted that the same effect may be obtained by switching the resonance frequency downwards, i.e. between $f_{res}=f_0$ and $f_{res}=f_0-\Delta f$. In this case, $f_{res}=f_0$ would be used in the transmission mode and $f_{res}=f_0-\Delta f$ would be used in the receiving mode.

It is noted that, unless otherwise indicated, the use of terms such as "upper", "lower", "left", and "right" refers solely to the orientation of the corresponding drawing.

It should be noted that the term "comprising" does not exclude other elements or steps and that the use of the articles "a" or "an" does not exclude a plurality. Also elements described in association with different embodiments may be combined. It should also be noted that reference signs in the claims should not be construed as limiting the scope of the claims.

The invention claimed is:
1. An RF bidirectional communication device utilizing active load modulation, the device comprising:
   a resonance circuit including an antenna, and
   a control unit, including a circuit, for controlling communication of the device, including switching between a transmission mode and a receiving mode,
   wherein the control unit is configured and arranged with the resonance circuit to
      modify a configuration of the resonance circuit such that the resonance circuit has a first resonance frequency when the device is in the receiving mode and a second resonance frequency when the device is in the transmission mode, and
      modify the configuration of the resonance circuit such that a Q-factor of the resonance circuit is periodically modified while the device is in the transmission mode by modifying the Q-factor of the resonance circuit within a modulation pause during transmission.

2. The device according to claim 1, wherein
   the resonance circuit comprises a switchable capacitive circuit, and
   the control unit is configured and arranged with the resonance circuit to modify the configuration of the resonance circuit by selectively connecting and disconnecting the switchable capacitive circuit and the antenna during a period throughout which the device is transmitting.

3. The device according to claim 2, wherein the control unit is adapted to connect the switchable capacitive circuit to the antenna when switching from the receiving mode to the transmission mode and to disconnect the switchable capacitive circuit from the antenna when switching from the transmission mode to the receiving mode.

4. The device according to claim 1, wherein the first resonance frequency is larger or smaller than the second resonance frequency.

5. The device according to claim 1, wherein the resonance circuit comprises an adjustable resistive circuit, wherein the control unit is adapted to adjust the resistance of the resistive circuit in an alternating manner when the device is in the transmission mode.

6. The device according to any of claim 1, wherein the first resonance frequency is 14.4075 MHz and/or the second resonance frequency is 13.56 MHz.

7. A method of performing bidirectional communication between an RF device and a reader/writer device, the method comprising
    setting the RF device to operate in a receiving mode by configuring a resonance circuit of the RF device to have a first resonance frequency, the resonance circuit including an antenna,
    receiving, at the RF device, a request for transmission from the reader/writer device,
    setting the RF device to operate in a transmission mode by configuring the resonance circuit of the RF device to have a second resonance frequency, and
    during operation in the transmission mode, modifying the configuration of the resonance circuit by modifying the Q-factor of the resonance circuit within a modulation pause during transmission such that a Q-factor of the resonance circuit of the RF device is periodically modified.

8. The method according to claim 7, further comprising
    after finalizing operation in the transmission mode, re-setting the RF device to operate in the receiving mode by configuring the resonance circuit of the RF device to have the first resonance frequency.

9. A computer program product comprising a non-transitory computer readable data carrier loaded with a computer program comprising computer executable instructions which when executed by a computer causes the computer to perform the steps of the method according to claim 7.

10. The computer program product of claim 9, wherein the computer executable instructions, when executed by the computer, cause the computer to periodically modify the Q-factor of the resonance circuit during a period throughout which the RF device is transmitting.

11. A system for performing bi-directional RF communication, the system comprising
    a reader/writer device, and
    a device according to claim 1.

12. The device of claim 1, wherein the control unit is configured and arranged with the resonance circuit to periodically modify the Q-factor of the resonance circuit within a modulation pause during transmission.

13. The device of claim 1, wherein the control unit is configured and arranged with the resonance circuit to force the antenna to an idle condition by modifying the Q-factor of the resonance circuit within a modulation pause while transmitting.

14. The device of claim 1, wherein the control unit is configured and arranged with the resonance circuit to mitigate increases in voltage settling time caused by high Q-factor transmission by modifying the Q-factor of the resonance circuit within a modulation pause while transmitting.

15. The device of claim 1, wherein modifying the configuration of the resonance circuit includes forcing the antenna to an idle condition by modifying the Q-factor of the resonance circuit within a modulation pause while transmitting.

16. The device of claim 1, wherein modifying the configuration of the resonance circuit includes mitigating increases in voltage settling time caused by high Q-factor transmissions.

17. The computer program product of claim 9, wherein the computer executable instructions, when executed by the computer, cause the computer to reduce the Q-factor of the resonance circuit within a modulation pause during transmission, therein forcing the antenna back to its idle condition.

18. The method of claim 7, wherein the second resonance frequency corresponds to a carrier frequency of the reader/writer device.

19. An RF communication apparatus for use in switching between a RF-communication transmission mode and a RF-communication receiving mode, the apparatus comprising:
    a resonance circuit, and
    circuitry configured and arranged with the resonance circuit to
        modify a configuration of the resonance circuit such that the resonance circuit has a first resonance frequency during the RF-communication receiving mode and has a second resonance frequency RF-communication transmission mode, and
        modify the configuration of the resonance circuit such that a Q-factor of the resonance circuit is periodically modified while the device is in the transmission mode, wherein the Q-factor of the resonance circuit is modified within a modulation pause during transmission.

20. The apparatus of claim 19, wherein the apparatus includes a reader/writer device and wherein the second resonance frequency corresponds to a carrier frequency of the reader/writer device.

* * * * *